United States Patent [19]

Fujiyama et al.

[11] Patent Number: 4,552,808
[45] Date of Patent: Nov. 12, 1985

[54] MAGNETIC RECORDING MATERIAL USING PLATE-SHAPED FERROMAGNETIC PARTICLES

[75] Inventors: Masaaki Fujiyama; Takamitsu Asai; Toshihiko Miura, all of Kanagawa, Japan

[73] Assignee: Fuji Photo Film Co., Ltd., Kanagawa, Japan

[21] Appl. No.: 554,658

[22] Filed: Nov. 23, 1983

[30] Foreign Application Priority Data

Nov. 25, 1982 [JP] Japan .................. 57-206521

[51] Int. Cl.⁴ .................. G11B 5/68; G11B 5/70
[52] U.S. Cl. .................. 428/328; 252/62.54;
360/134; 360/135; 360/136; 427/128; 427/365;
427/366; 428/329; 428/336; 428/409; 428/694;
428/900
[58] Field of Search .................. 428/694, 695, 900, 328,
428/329, 336, 409; 252/62.54; 427/128–132,
359, 365, 366; 360/134–136

[56] References Cited

U.S. PATENT DOCUMENTS

| 3,023,166 | 2/1962 | Duinker | 428/402 |
| 3,117,065 | 1/1964 | Wootten | 360/134 |
| 3,144,520 | 8/1964 | Levin | 360/134 |
| 3,185,775 | 5/1965 | Camras | 360/134 |
| 4,135,016 | 1/1979 | Ogawa | 428/900 |
| 4,341,648 | 7/1982 | Kubo | 252/62.56 |
| 4,442,159 | 4/1984 | Dezawa | 428/694 |
| 4,486,496 | 12/1984 | Dezawa | 428/329 |

Primary Examiner—Ellis P. Robinson
Attorney, Agent, or Firm—Sughrue, Mion, Zinn, Macpeak, and Seas

[57] ABSTRACT

A magnetic recording material is disclosed which is comprised of a single magnetic layer comprised of plate-shaped ferromagnetic particles wherein the greater number in the surface part of the magnetic layer than in the inner part and/or the plate-shaped ferromagnetic particles are aligned such that an average horizontal axis component of the particles with respect to the surface of magnetic layer is larger in the surface part than in the inner part. The location and alignment of the particles make it possible to increase output with short-wave recording.

27 Claims, 2 Drawing Figures

MAGNETIC RECORDING MATERIAL USING PLATE-SHAPED FERROMAGNETIC PARTICLES

FIELD OF THE INVENTION

The present invention relates to a magnetic recording material and more particularly, to a magnetic recording material using plate-shaped ferromagnetic particles, which makes it possible for a large amount of information to be recorded in a small area of recording material.

BACKGROUND OF THE INVENTION

Magnetic recording materials, such as video tapes, audio tapes, memory tapes and floppy disks, are constructed fundamentally of a non-magnetic support and a magnetic layer provided thereon. The magnetic layer has as its predominent constituents ferromagnetic particles, a binder and additives (e.g., an antistatic agent, a lubricant, etc.). The ferromagnetic particles are generally made up of acicular or an cubic iron oxide, chromium oxide or certain alloys, and are uniformly oriented in the direction of magnetic recording (for instance, in the longitudinal direction of a magnetic tape in the case of a recording system which utilizes a longitudinal component of magnetization) in the magnetic layer.

In recent years, vertical magnetization recording systems have been proposed (in, e.g., U.S. Pat. No. 4,210,946) for the purpose of recording a large amount of information in a small area of a magnetic material. Ferromagnetic particles employed in such systems differ from conventional ones in having a plate-like shape. More specifically, so-called hexagonal plate-shaped particles, such as barium ferrite, strontium ferrite and the like, are employed as the ferromagnetic particles therein. In such systems, various investigations for increasing the output of plate-shaped ferromagnetic particles in the short wave-length region have been made and reported in, for example, U.S. Pat. No. 4,341,648 and Japanese Patent Application (OPI) Nos. 67904/81 and 134522/81.

SUMMARY OF THE INVENTION

Therefore, a primary object of the present invention is to provide a magnetic recording material which utilizes plate-shaped ferromagnetic particles having increased output in the short wavelength region.

Another object of the present invention is to provide a magnetic recording material having an output raised up to its maximum in the short-wave recording system.

A further object of the present invention is to provide a magnetic recording material which makes it possible for information to be recorded and reproduced using short waves of energy having wavelengths ranging from 0.5 μm to 1 μm.

Still another object of the present invention is to provide a magnetic recording material suitable for recording a large amount of information in a small area thereof.

As a result of various examinations for attaining the above-described objects, it has now been found that the highest level of output with short-wave recording is achieved without being attended by impaired output in long-wave length recording if plate-shaped ferromagnetic particles having an axis of easy magnetization oriented in the direction almost perpendicular to their individual plate planes are contained in a magnetic layer and that the particles are present in greater numbers per unit volume in a surface part of the magnetic layer than in an inner part of the magnetic layer and/or they are aligned such that an average horizontal axis component (i.e., component parallel to the surface of the magnetic layer) of the particles is larger in the surface part than in the inner part.

DETAILED DESCRIPTION OF THE INVENTION

If plate-shaped ferromagnetic particles are incorporated in a magnetic layer using the same methods as applied to acicular or cubic ferromagnetic particles, desirable results cannot be obtained. More specifically, (1) if plate-shaped ferromagnetic particles are oriented in the direction perpendicular to the coated layer surface in a magnetic field and then, subjected to a drying treatment, surface smoothness of the resulting magnetic layer is deteriorated and a desired video output cannot be obtained, and (2) if plate-shaped ferromagnetic particles are oriented in a magnetic field and further, dried in the magnetic field, surface smoothness of the resulting magnetic layer is deteriorated all the more, and a desired video output cannot be obtained.

Namely, a magnetic layer containing magnetic particles aligned in the same direction as a whole has insufficient surface smoothness, and ferromagnetic particles tend to aggregate in a magnetic field. Accordingly, the expected high level of output cannot be obtained with short-wave length recording.

Figure 1:
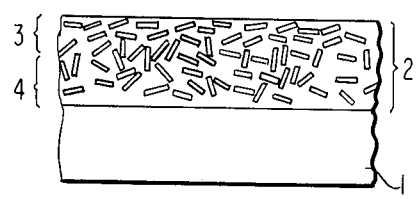
FIG. 1 is a vertical sectional view of the magnetic recording material of this invention wherein the numeral 1 designates a non-magnetic support, the numeral 2 a magnetic layer, the numeral 3 the surface part of the magnetic layer, and the numeral 4 the inner part of the magnetic layer.
Figure 2:
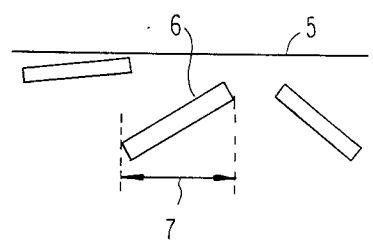
FIG. 2 is an enlarged sectional view of the magnetic layer wherein the numeral 5 designates the surface of the magnetic layer, the numeral 6 a plate-shaped ferromagnetic particle and the numeral 7 the horizontal axis component of the particle.

On the other hand, as illustrated in FIG. 1, the magnetic recording material of the present invention has on a non-magnetic support 1 a magnetic layer 2 which contains plate-shaped ferromagnetic particles, the ferromagnetic particles being present in greater number (per unit volume) in a surface part 3 of the magnetic layer than in an inner part 4 of the magnetic layer and/or being aligned such that an average horizontal axis component 7 of the particles as shown in FIG. 2 is larger in the surface part 3 than in the inner part 4. The term "surface part" used herein means the upper ½ with respect to the thickness of the magnetic layer 2. The number of ferromagnetic particles in the surface part 3 is 10 to 20% greater than that in the inner part 4, and is generally $10^{10}$ to $10^{20}/cm^3$, preferably $10^{12}$ to $10^{18}/cm^3$, more preferably $10^{14}$ to $10^{16}/cm^3$. The ratio of the average horizontal axis component 7 in the surface part 3 to that in the inner part 4 is more than 1/1, preferably more than 1.2/1, more preferably more than 1.5/1.

Ferromagnetic particles which can be employed in the present invention include barium ferrite ($BaFe_{12}O_{19}$: hexagonal type ferrite), barium ferrites which have been replaced by another metal such as Ca, Sr, Pb, Co and Ni at a part of the barium sites or the iron sites, manganese-bismuth (MnBi), manganese-bismuth a part of which has been replaced by a metal like Se, and so on. The ferromagnetic particles have a plate-like shape, such as the shape of a circular plate, a hexagonal plate, etc., and their axes of easy magnetization are perpendicular to the plate surface. These ferromagnetic particles can be prepared by conventional methods as described in, for example, U.S. Pat. No. 4,341,648. The ferromagnetic particles are preferably as small as possible in size, since recording density is increased and noise is diminished as the mean particle size becomes small. In general, the size of the particles used is 0.01 to 10 μm, preferably 0.01 to 0.3 μm, more preferably 0.01 to 0.1 μm. The thickness of the ferromagnetic particles may be almost equal to or less than their diameter, and it is preferably ½ to 1/15, more preferably ⅓ to 1/10, as large as the diameter.

The magnetic layer of the present invention can additionally contain a binder, additives (e.g., a lubricant, an antistatic agent, an abrasive, etc.) and so on. Binders, additives and non-magnetic support which can be employed in the present invention include those which are described in U.S. Pat. No. 4,135,016 and Japanese Patent Publication 26890/81. Preferred examples of the binder include vinyl chloride-vinyl acetate copolymer, vinyl chloride-vinylidene chloride copolymer, nitrocellulose, polyester polyol, polyurethane, polyisocyanate and a mixture thereof. The plate-shaped ferromagnetic particles are generally used in an amount of 1 to 20 parts by weight, preferably 3 to 15 parts by weight, more preferably 4 to 10 parts by weight per part by weight of the binder.

The magnetic layer coated on a non-magnetic support is dried and generally subjected to a super-calendering processing. The super-calendering processing is generally carried out at a linear pressure of 50 kg/cm or more, preferably 150 kg/cm or more, a temperature of 50° C. or more, preferably from 50° to 100° C. and a rate of 5 m/min or more, preferably from 15 to 100 m/min. Further magnetic orientation may be carried out before or during the drying step using either an electromagnet or permanent magnet of 200 Oe to 10 KOe, preferably 1 KOe to 5 KOe.

The magnetic recording material of the present invention can be prepared using one of the following surface particle-alignment methods:

(1) a method of forcing the surface of a magnetic layer to come into contact with a heating roll;

(2) a method of forcing the magnetic recording material to pass between a compressive rubbing roll and a tape driving roll, which differ in rotating speed, in such a manner that the magnetic layer may have contact with the compressive rubbing roll;

(3) a method of forcing the magnetic recording material to pass between a hard compressive rubbing roll and a soft roll, which differ in rotating speed, in such a manner that the magnetic layer may have contact with the hard compressive rubbing roll;

(4) a method of forcing the magnetic recording material to pass between a heated hard (metal) roll having a small diameter and a cooled hard (metal) roll having a large diameter in such a manner that the magnetic layer may have contact with the hard (metal) roll having a small diameter; and (5) a method in which in the course of or after coating a magnetic coating solution on a SUS drum, magnetic orientation is carried out as a drying air flow is supplied thereto, wherein a N-pole is arranged inside the drum and a S-pole is disposed farther to the magnetic layer than the N-pole, and the magnetic layer formed is peeled off the drum and, at the same time, applied to an adhesive layer provided on a non-magnetic support (a drum transfer method).

In method (1), the surface temperature of the heat roll is preferably set to 60° C. or higher, more preferably from 80° to 150° C. The heating roll is more effective the smaller its diameter is. The diameter of the heating roll is preferably 1 to 30 cm, more preferably 1 to 10 cm. Further if the heating roll is a fixed roll, the roll having a smaller diameter produces more desirable result. In general, the differences in number of ferromagnetic particles and particle alignment between the surface part and the inner part is increased with higher processing temperature and processing speed.

In method (2), it is preferable for the magnetic layer and the compressive rubbing roll, which comes into contact therewith, to have a difference in speed. The difference in speed is preferably 0.2 to 20%, more preferably 2 to 10%. Additionally, the temperature of the compressive rubbing roll is preferably 60° C. or higher, more preferably 80° C. or higher.

In method (3), it is preferable to let the magnetic layer and the hard compressive rubbing roll which comes into contact therewith to have a difference in speed. A desirable difference in speed is 0.1% or more, preferably 0.2 to 20%, more preferably 2 to 10%. The temperature of the hard compressive rubbing roll is preferably 60° C. or higher, more preferably 80° C. or higher, and particularly preferably 100° C. or higher. The soft roll which comes into contact with the non-magnetic support preferably has a larger diameter than the hard roll.

In method (4), the hard roll which comes into contact with the magnetic layer has a smaller diameter than the hard roll which comes into contact with the non-magnetic support. The ratio of the diameter of the former roll to that of the latter one is generally not more than 1/1.3, preferably not more than ½, more preferably not more than 1/10. The temperature of the hard roll which comes into contact with the magnetic layer is generally more than 40° C., preferably more than 70° C., more preferably more than 100° C. and most preferably 110° C. to 120° C. The hard roll which comes into contact with the non-magnetic support is preferably cooled with water. Additionally, it is better to rotate the hard roll which comes into contact with the magnetic layer at a higher speed.

The methods (1) to (4) are generally performed at a processing rate of 1 m/min or more, preferably 50 m/min or more and particularly preferably 100 m/min or more, and the roll pressure in these methods is preferably 200 kg/cm or more and particularly preferably 300 kg/cm or more.

In drum transfer method (5), the drum preferably has a mirror surface having a center line surface roughness (Ra) of not more than 0.030 mm, more preferably not more than 0.015 mm and most preferably not more than 0.010 mm. Further, the magnetic layer is preferably in contact with the drum till drying of the magnetic layer has been finished.

These surface particle-alignment methods may be performed independently or in combination thereof. Of these, methods (2) and (3) are preferably used for the purpose, and the combination of methods (1) and (2) is particularly preferred.

The surface particle-alignment method may be performed before or after a super-calendering processing but preferably after the processings. The magnetic layer preferably has a glass transition point (Tg) of not more than 80° C., more preferably not more than 70° C., most preferably not more than 65° C., at the stage of surface particle alignment.

The thickness of the magnetic layer of the present invention is generally from 0.5 to 20 μm, preferably from 1 to 7 μm and more preferably from 2 to 5 μm.

The magnetic layer of the present invention has a smooth surface. Ferromagnetic particles present in the surface part 3 are effective for the short-wave length recording and are aligned in the direction parallel to the surface of the coated layer. The magnetic recording material of the present invention has the following effects:

(1) Output in the short wave-length region is extremely high;
(2) Head abrasion is extremely reduced;
(3) Durability of the magnetic layer is increased;
(4) Demagnetization due to repeated reproduction is reduced; and
(5) Stains on a video head and a running system are decreased.

The present invention will now be illustrated in more detail by referent to the following examples. However, the scope of the invention is not limited to these examples. Additionally, all parts in the following examples are by weight unless otherwise indicated.

EXAMPLE 1

A magnetic coating composition having the following amounts of ingredients was coated on a 13 μm-thick polyethylene terephthalate film in a dry thickness of 4.5 μm. Then, it was subjected to a surface treatment and thereafter, slit into video tapes of a width of ½ inch.

| Magnetic Coating Composition: | Parts |
| --- | --- |
| Barium-Ferrite | 100 |
| (Particle size: 0.1 μm × 0.03 μm; Hc: 900 Oe) | |
| Vinyl Chloride-Vinyl Acetate Copolymer | 6.5 |
| Carbon Black | 1 |
| Tolylenediisocyanate Type Polyurethane having Ester Bonding | 4 |
| Lecithin | 1 |
| Polyisocyanate | 6 |

The above-described composition was prepared by, first, mixing the ingredients except for the polyisocyanate with an organic solvent and then adding the polyisocyanate thereto.

In addition, the surface treatment was conducted by subjecting the coated composition to a 3-stage super-calender roll processing at 50° C. under a linear pressure of 200 kg/cm and further, by subjecting ferromagnetic particles present in the surface part to one of the surface particle-alignment processings described in Table 1. Samples obtained by carrying out both the above-described super-calendering processing and the surface particle-alignment processing were numbered from 1 to 7. Additionally, comparative samples C-1 to C-4 were prepared by carrying out the super-calendering processing alone (i.e., without carrying out the processing of surface particles alignment). Characteristics of the samples obtained are shown in Table 1 below. Therein, reproduction output was evaluated under the condition that the relative speed of the video head was 3.5 m/sec., the recording frequency was 5.8 MHz, and the recording wave-length was 0.6 μm.

TABLE 1

| Sample No. | Magnetic Orientation after Coating | Method Used for Surface Particle Alignment after Drying | Reproduction Output (dB) | Head Abration (μ/100 hr) | Squareness Ratio in Vertical Direction | Remark |
| --- | --- | --- | --- | --- | --- | --- |
| 1 | Dried without being Oriented in Any Direction | Heating Roll | +1.0 | 5.0 | 0.41 | Method (1) |
| 2 | Dried without being Oriented in Any Direction | Compressive Rubbing Roll | +2.0 | 4.0 | 0.41 | Method (2) |
| 3 | Dried without being Oriented in Any Direction | Hard Compressive Rubbing Roll | +3.0 | 3.5 | 0.42 | Method (3) |
| 4 | Dried without being Oriented in Any Direction | Heating Metal Roll | +1.5 | 4.5 | 0.41 | Method (4) |
| 5 | Dried without being Oriented in Any Direction | Hard Compressive Rubbing Roll | +3.5 | 3.0 | 0.41 | Method (3) (Grain Size: 0.08 μm × 0.02 μm) |
| 6 | Dried without being Oriented in Any Direction | Hard Compressive Rubbing Roll | +4.0 | 2.5 | 0.42 | Method (3) (Upper Stage Roll: 100° C.) |
| 7 | Oriented in Longitudinal Direction | Hard Compressive Rubbing Roll | +1.0 | 5.0 | 0.39 | Method (3) |
| C-1 | Dried after Vertical Orientation | — | −2.0 | 7.0 | 0.43 | |
| C-2 | Oriented in Vertical Direction, and | — | −3.0 | 8.0 | 0.57 | |

TABLE 1-continued

| Sample No. | Magnetic Orientation after Coating | Method Used for Surface Particle Alignment after Drying | Reproduction Output (dB) | Head Abration (μ/100 hr) | Squareness Ratio in Vertical Direction | Remark |
| --- | --- | --- | --- | --- | --- | --- |
| C-3 | Dried in Magnetic Field Dried without being Oriented in Any Direction | — | 0 | 6.0 | 0.41 | |
| C-4 | Oriented in Longitudinal Direction | — | −1.0 | 7.0 | 0.39 | |

EXAMPLE 2

The same magnetic coating composition as used in Example 1 was coated on a mirror surface of a non-magnetic metal drum in a dry thickness of 4.5 μm, and dried. This coated layer was transferred onto an adhesive layer (thickness: 0.8 μm) provided on the same non-magnetic support as used in Example 1 to obtain a video tape. At the time of coating, the sample which received no particle orientation processing was named Sample 8, and the sample which received vertical orientation processing and was dried on the drum (, that is, the sample prepared using method (5)) was named Sample 9. Characteristics obtained are shown in Table 2 below.

TABLE 2

| Sample No. | Reproduction Output (dB) | Head Abrasion (μ/100 hr) | Squareness Ratio in Vertical Direction |
| --- | --- | --- | --- |
| 8 | +1.7 | 4.5 | 0.41 |
| 9 | +3.0 | 3.5 | 0.42 |

As can be seen in the cases of comparative samples C-1 to C-4, if the magnetic layer was not subjected to the processing of surface particle alignment even though ferromagnetic particles having a plate shape and an axis of easy magnetization in the vertical direction were incorporated therein, the reproduction output in the short-wave recording was lowered to −2 dB to −3 dB and, further, the head abrasion was increased with the sample which received the vertical magnetic orientation processing (comparative samples C-1 and C-2) as compared with the sample which received no magnetic orientation processing (comparative sample C-3).

If the magnetic layer contained ferromagnetic particles having a plate shape and an axis of easy magnetization in the vertical direction and a large horizontal axis component in its surface part, the reproduction output was increased and the head abrasion was decreased even if the magnetic layer was dried without receiving any magnetic orientation processing. Though the reason for the abovedescribed effects cannot be imagined from conventional phenomena, such effects are believed to be peculiar to plate-shaped ferromagnetic particles having an axis of easy magnetization in the vertical direction. More specifically, even if such particles are employed and the orientation thereof in the vertical direction (squareness ratio=Br/Bm) is heightened, instead of being increased as generally imagined, the output is rather decreased, compared with that of the non-oriented ones. In addition, when recording using a ring head of a narrow gap, it was found that the magnetic layer in which particles were present in greater number and/or particles present in the surface part were aligned parallel to the recording surface could obtain high sensitivity with long-wave recording.

The manner in which the ferromagnetic particles (contained in the magnetic recording materials included in the spirit and the scope of the present invention) are aligned in the surface part and the inner part of the magnetic layer can be investigated by electron microphotographs of the surface and vertical sections of the magnetic layer, X-ray analysis of the magnetic layer using surface cutting processes, and so on.

While the invention has been described in detail and with reference to specific embodiment thereof, it will be apparent to one skilled in the art that various changes and modifications can be made therein without departing from the spirit and scope thereof.

What is claimed is:

1. A magnetic recording material, comprising:
   a non-magnetic support base having provided thereon;
   a single magnetic recording layer comprised of plate-shaped ferromagnetic particles dispersed in a binder, wherein the ferromagnetic particles have a mean size of 0.01 μm to 10 μm, and wherein the thickness of the ferromagnetic particles is equal to or less than their diameter, wherein the plate-shaped ferromagnetic particles are present in greater numbers per unit volume in surface part of the single magnetic layer than in an inner part of the single magnetic layer and/or the plate-shaped ferromagnetic particles are aligned such that an average horizontal axis component of the particles which respect to the surface of the single magnetic layer is larger in the surface part than in the inner part thereof.

2. A magnetic recording material as claimed in claim 1, wherein the ferromagnetic particles have a circular plate-like shape.

3. A magnetic recording material as claimed in claim 1, wherein the ferromagnetic particles have a hexagonal plate-like shape.

4. A magnetic recording material as claimed in claim 1, wherein the ferromagnetic particles have a mean size in the range of from 0.01 μm to 0.3 μm.

5. A magnetic recording material as claimed in claim 1, wherein the thickness of the ferromagnetic particles is in the range of ½ to 1/15 of the diameter.

6. A magnetic recording material as claimed in claim 1, wherein the number of the plate-shaped ferromagnetic particles in the surface part is 10 to 20% greater than that in the inner part.

7. A magnetic recording material as claimed in claim 6, wherein the number of the plate-shaped ferromagnetic particles in the surface part is from $10^{10}$ to $10^{20}/cm^3$.

8. A magnetic recording material as claimed in claim 6, wherein the number of the plate-shaped ferromagnetic particles in the surface part is from $10^{12}$ to $10^{18}/cm^3$.

9. A magnetic recording material as claimed in claim 6, wherein the number of the plate-shaped ferromagnetic particles in the surface part is from $10^{14}$ to $10^{16}/cm^3$.

10. A magnetic recording material as claimed in claim 1, wherein the ratio of the average horizontal axis component in the surface part to that in the inner part is more than 1.2/1.

11. A magnetic recording material as claimed in claim 1, wherein the ratio of the average horizontal axis component in the surface part to that in the inner part is more than 1.5/1.

12. A magnetic recording material as claimed in claim 1, wherein the ferromagnetic particles are present in an amount of 1 to 20 parts by weight per part by weight of the binder.

13. A magnetic recording material as claimed in claim 12, wherein the magnetic layer has a thickness of from 0.5 to 20 μm.

14. A magnetic recording material as claimed in claim 1, wherein said magnetic recording material is formed by subjecting the same to at least one surface particle alignment method selected from the group consisting of:
    forcing the surface of the magnetic layer to come into contact with a heated roll;
    forcing the magnetic recording material to pass between a compressive rubbing roll and a tape driving roll, which differ in rotating speed, in such a manner that the magnetic layer has contact with the compressive rubbing roll;
    forcing the magnetic recording material to pass between a hard compressive rubbing roll and a soft roll, which differ in rotating speed, in such a manner that the magnetic layer has contact with the hard compressive rubbing roll; and
    forcing the magnetic recording material to pass between a heated hard roll having a small diameter and a cooled hard roll having a large diameter in such a manner that the magnetic layer has contact with the hard roll having a small diameter.

15. A magnetic recording material as claimed in claim 14, wherein the particle alignment method is method (1) and wherein the surface temperature of the heated roll is 60° C. or higher and the diameter of the heated roll is 1–30 cm.

16. A magnetic recording material as claimed in claim 14, wherein the surface particle alignment method is method (2) and wherein the difference in speed is 0.2 to 20% and the temperature of the compressive rubbing roll is 60° C. or higher.

17. A magnetic recording material as claimed in claim 16, wherein the difference in speed is 2 to 10% and the temperature of the compressive rubbing roll is 80° C. or higher.

18. A magnetic recording material as claimed in claim 15, wherein the surface particle alignment method is method (3) and wherein the difference of speed is 0.1% or more and the temperature of the hard compressive rubbing roll is 60° C. or higher.

19. A magnetic recording material as claimed in claim 18, wherein the difference in speed is 0.2 to 20% and the temperature of the hard compressive rubbing roll is 80° C. or higher.

20. A magnetic recording material as claimed in claim 14, wherein the surface particle alignment method is method (4) and wherein the ratio of the diameter of the hard roll which comes into contact with the magnetic layer to the diameter of the hard roll which comes into contact with the non-magnetic base is not more than 1/1.3 and the temperature of the hard roll which comes into contact with the magnetic layer is more than 40° C.

21. A magnetic recording material as claimed in claim 14, wherein the surface particle alignment method is carried out at a processing rate of 1 m/min or more and at a roll pressure of 200 kg/cm or more.

22. A magnetic recording material as claimed in claim 1, wherein the magnetic recording material is formed by coating a magnetic coating solution on a SUS drum, and then carrying out magnetic orientation as a drying air flow is supplied to the magnetic coating solution, wherein an N-pole is arranged inside the SUS drum and an S-pole is disposed farther from the magnetic layer than the N-pole, the magnetic layer thus formed being peeled off the SUS drum and, at the same time, applied to an adhesive layer provided on a non-magnetic support.

23. A magnetic recording material as claimed in claim 22, wherein the SUS drum has a mere surface having a center line surface roughness of not more than 0.30 mm.

24. A magnetic recording material as claimed in claim 14, wherein the at least one surface particle alignment method is carried out before or after supercalendering the magnetic recording layer.

25. A magnetic recording material as claimed in claim 24, wherein the surface particle alignment method is carried out after supercalendering.

26. A magnetic recording material as claimed in claim 25, wherein supercalendering is carried out at a linear pressure of 50 kg/cm or more, a temperature of 50° C. or more and at a rate of 5 m/min or more.

27. A magnetic recording material as claimed in claim 26, wherein said linear pressure is 150 kg/cm or more, said temperature is from 50° C. to 100° C. and the rate is 15 to 100 m/min.

* * * * *